(12) United States Patent
Wu et al.

(10) Patent No.: US 8,774,533 B2
(45) Date of Patent: Jul. 8, 2014

(54) QUANTIFYING SOCIAL AFFINITY FROM A PLURALITY OF IMAGES

(75) Inventors: Peng Wu, San Jose, CA (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 341 days.

(21) Appl. No.: 12/902,818

(22) Filed: Oct. 12, 2010

(65) Prior Publication Data

US 2012/0087548 A1    Apr. 12, 2012

(51) Int. Cl.
*G06K 9/62* (2006.01)
*G06K 9/00* (2006.01)
*G06K 9/46* (2006.01)

(52) U.S. Cl.
USPC ............ 382/225; 382/115; 382/118; 382/192

(58) Field of Classification Search
USPC .................................. 382/115, 118, 192, 225
See application file for complete search history.

(56) References Cited

U.S. PATENT DOCUMENTS

| | | | | |
|---|---|---|---|---|
| 8,041,082 | B1 * | 10/2011 | Baluja et al. ................... | 382/118 |
| 8,229,865 | B2 * | 7/2012 | Campbell et al. ............... | 706/12 |
| 8,311,950 | B1 * | 11/2012 | Kunal et al. .................... | 705/319 |
| 8,325,999 | B2 * | 12/2012 | Kapoor et al. .................. | 382/118 |
| 8,326,091 | B1 * | 12/2012 | Jing et al. ....................... | 382/305 |
| 2008/0049976 | A1 * | 2/2008 | Isomura et al. ................ | 382/106 |
| 2008/0097994 | A1 | 4/2008 | Teramoto et al. | |
| 2009/0103887 | A1 * | 4/2009 | Choi et al. ...................... | 386/52 |
| 2009/0192967 | A1 | 7/2009 | Luo et al. | |
| 2009/0284531 | A1 | 11/2009 | Ishioka | |

FOREIGN PATENT DOCUMENTS

WO    2009116049 A2    9/2009

OTHER PUBLICATIONS

Peng Wu; Weimin Ding; Zhidong Mao; Tretter, D.; , "Close & Closer: Discover social relationship from photo collections," Multimedia and Expo, 2009. ICME 2009. IEEE International Conference on , vol., No., pp. 1652-1655, Jun. 28, 2009-Jul. 3, 2009.*

David Crandall, et al; "Mapping the World's Photos"; WWW 2009; Apr. 20-24, 2009; Madrid, Spain; http://www.cs.cornel.edu/~dph/papers/photomap-www09.pdf.

Peng Wu, et al; "Close & Closer: Discover Social Relationship from Photo Collections"; Proceedings of the 2009 IEEE International Conference on Multimedia and Expo; 2009; New York, NY, U.S.A.

Scott A. Golder, "Measuring Social Networks with Digital Photograph Collections", ACM 2008, http://www.hpl.hp.com/research/scl/papers/sna-photos/sna-photos-ht08-preprint.pdf.

M.E.J. Newman; "Finding Community Structure in Networks using the Eigenvectors of Matrices"; Jul. 23, 2006; http://arxiv.org/PS_cache/physics/pdf/0605/0605087v3.pdf.

(Continued)

*Primary Examiner* — Utpal Shah

(57) ABSTRACT

A method of quantifying social affinity from multiple images includes identifying each image showing both a first person and a second person and determining a weighted affinity value between the first person and the second person. The weighted affinity value is determined based on a total number of persons appearing in each identified image, a physical distance between the first person and the second person represented in each identified image, and a total number of identified images.

21 Claims, 10 Drawing Sheets

(56) References Cited

OTHER PUBLICATIONS

Ryan Rowe, et al; "Automated Social Hierarchy Detection through Email Network Analysis"; Proceedings of the Joint 9th WebKDD and 1st SNA-KDD Workshop '07; Aug. 12, 2007; ACM; San Jose, CA, U.S.A.

Liexian Gu, et al; "Clustering Consumer Photos Based on Face Recognition"; ICME 2007; IEEE; 2007; pp. 1998-2001.

* cited by examiner

QUANTIFYING SOCIAL AFFINITY FROM A PLURALITY OF IMAGES

BACKGROUND

The extraction of useful data from the analysis of images has been a very active area of research in recent years. While the earliest forms of image processing focused mainly on adjusting the visual aspects of an image, the ever-increasing processing power of modern computers has allowed for the implementation of more powerful image processing algorithms that provide for the extraction of semantic information from photographic images.

Most photographic images convey a great deal of semantic information that is readily apparent to a human viewer. For example, often a human viewer viewing one or more photographic images can infer the existence of a social relationship existing between two or more persons appearing in the images. While such semantic information can be very useful, the extraction of accurate social relationship data from images by machines has been enigmatic.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
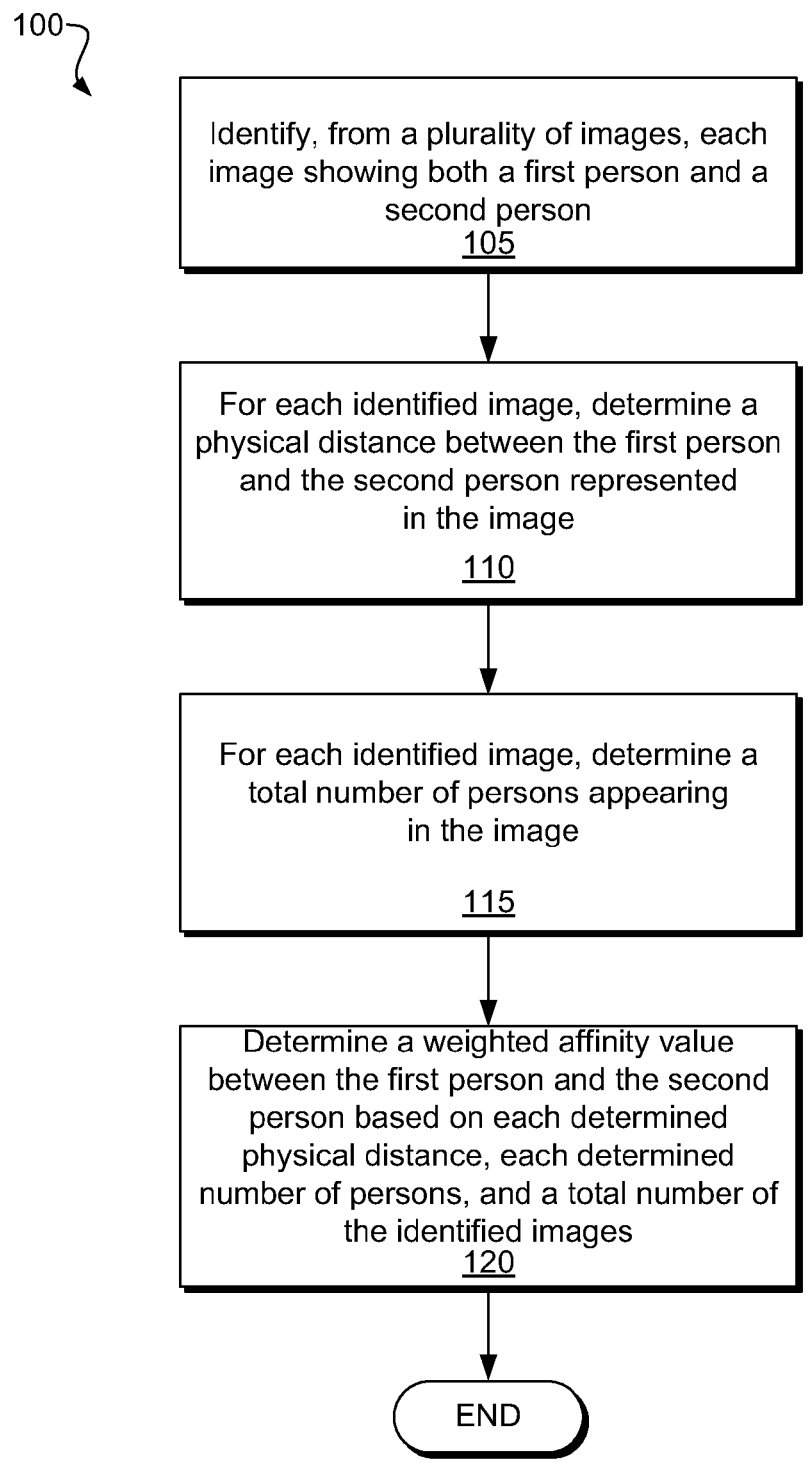
FIG. 1 is a flowchart of an illustrative method of quantifying social affinity from a plurality of images, according to one example of principles described herein.

The present specification discloses methods and systems for quantifying social affinity between at least a first person and a second person appearing in a plurality of images, such as photographs. In these methods and systems, at least one processor identifies each image in the plurality of images showing both the first person and the second person. Then, for each identified image, the at least one processor determines a weighted affinity value between the first person and the second person based on a total number of persons appearing in each identified image, a physical distance represented in each identified image between the first person and the second person, and the total number of identified images.

The physical distance between the first person and the second person may in general be inversely proportionate to the amount of affinity between the first person and the second person. Additionally, the number of persons appearing in each of the identified images and the number of identified images may affect the credibility of physical distance as an indicator of social affinity. Therefore, a quantification of social affinity between the first person and the second person can be derived by weighing the physical distance between the first person and the second person in each identified photo by these factors and summing the weighted physical distances.

This quantification of social affinity in this way has many applications. One of these applications is the identification of social clusters. In situations where a group of persons appearing in a plurality of images has been identified, social clusters within the group can be identified by quantifying the social affinity between each possible pair of persons in the group, constructing a matrix of quantified affinity values, and partitioning the persons in the group into clusters based on the matrix. For example, the persons may be partitioned into clusters such that the modularity of the clusters is maximized.

The ability to identify and measure social affinity and social clusters made possible by the methods and systems of the present specification offer many benefits. These benefits include, but are not limited to, 1) the improved organization and browsing of image collections based on identified social relationships or clusters, 2) the ability to automatically produce image products (e.g., photo albums) customized for a specific social cluster or relationship, and 3) the construction of a more complete and complex social graph in the study of social networking.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As used in the present specification, including the appended claims, the term "image" is defined as a representation of a visual or optical perception.

As used in the present specification, including the appended claims, the transitive verb "weight" is defined as the act of increasing or decreasing a quantitative value based on a secondary value or condition. Similarly, the adjective "weighted" refers to a quantitative value adjusted based on a secondary value or condition or to a quantitative value that is the sum of one or more quantitative values adjusted based one or more secondary values or conditions.

As used in the present specification, including the appended claims, the term "tag" is defined as data that identifies a spatial area of an image with a specific person.

The processes for quantifying social affinity from a plurality of images disclosed in the present specification can be embodied as a method, a system, or as executable computer code stored on a tangible computer-readable storage medium. As such, aspects of the methods and systems disclosed may be implemented entirely in hardware or as machine readable instructions executed by special-purpose hardware, or as machine readable instructions executed by general purpose hardware.

Various aspects of the methods and systems disclosed herein for quantifying social affinity from a plurality of images are described with reference to flowchart diagrams. Each block in these flowchart diagrams can be implemented by hardware and/or computer executable code that, when provided to one or more processors of a computer, causes the one or more processors to perform or cause to be performed the functionality described in that particular block. Where a flowchart diagram illustrates a sequence of blocks in connection with an order of execution, this order of execution is an example. In certain examples, it is contemplated that the functions recited in the blocks may occur out of the shown execution order.

Referring now to FIG. 1, a flowchart diagram is shown of an illustrative method (100) of quantifying social affinity between a first person and a second person from a plurality of images. The method (100) includes identifying (block 105), from the plurality of images, each image showing both the first person and the second person. This identification may be made through the use of tags, where a tag in an image associates a spatial area of the image with a person that is visually represented within that spatial area of the image. The tags may be added manually by a human user viewing the images on a computer and/or automatically by a computer.

Figure 2:
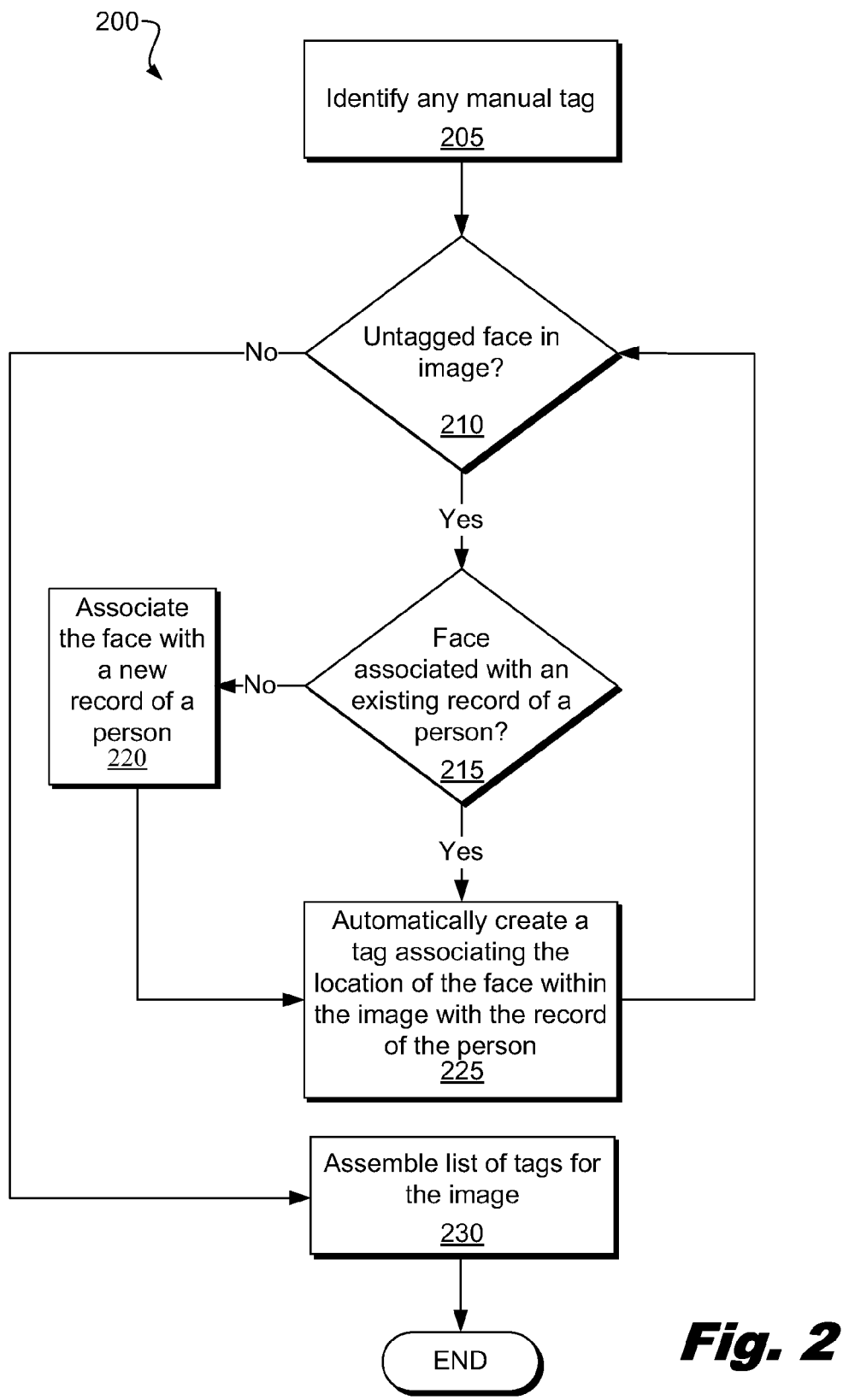
FIG. 2 is a flowchart of an illustrative method of identifying persons in a plurality of images, according to one example of principles described herein.

Referring now to FIG. 2, a flowchart diagram is shown of one example method (200) of identifying persons appearing in an image. This method (200) may be repeated for each image in a plurality of images to tag each identifiable person appearing in the plurality of images. In the method (200), any manual tags for the images are first identified (block 205). In this method (200), deference is given to human users entering manual tags for the images, and no effort is made by a processor implementing the example method (200) to change or correct the manual tags. Of course, in alternate examples a processor (200) may evaluate the quality or accuracy of manual tags and remove and/or replace manual tags of low quality or accuracy.

Face recognition may be performed on the image to determine (block 210) whether any human face appears in the image that is not already associated with a tag. Any face recognition technique in the art may be used that best suits a particular application of the principles described herein. One example of applicable face recognition is described in Liexian Gu et al., *Clustering Consumer Photos Based on Face Recognition*, Proceedings of IEEE International Conference on Multimedia and Expo, July 2007, at 1998-2001, which is incorporated herein by reference in its entirety.

If an untagged face appears in the image, a determination (block 215) is made as to whether the face is associated with a known person for whom a record exists. If not, the face may be treated as belonging to a newly discovered person and associated with a new record (block 220). Whether the untagged face is associated with a previously known person or a new record, a tag may be automatically created (block 225) that associates a spatial area occupied by the face in the image with its corresponding record of a person. The process of identifying and automatically tagging untagged faces (blocks 210 to 225) may be repeated until no detected untagged face remains in the image. At that point, a list of tags is assembled (block 230) for the image, and the image is treated as having all persons appearing within it identified. Once the method (200) has been performed for each image in a plurality of photos, a list of persons appearing in each image may be available.

Returning to FIG. 1, the identification (block 105) of each image showing both the first person and the second person may be carried out by reviewing a list of persons tagged in each image and identifying each image in which both the first person and the second person are tagged. This identification may also include a determination of a total number of the identified images.

Once the images showing both the first person and the second person have been identified (block 105), a physical distance represented in each identified image between the first person and the second person may be determined (block 110). In other words, the actual real space physical distance between the first person and the second person represented in each identified image may be approximated.

Figure 3:
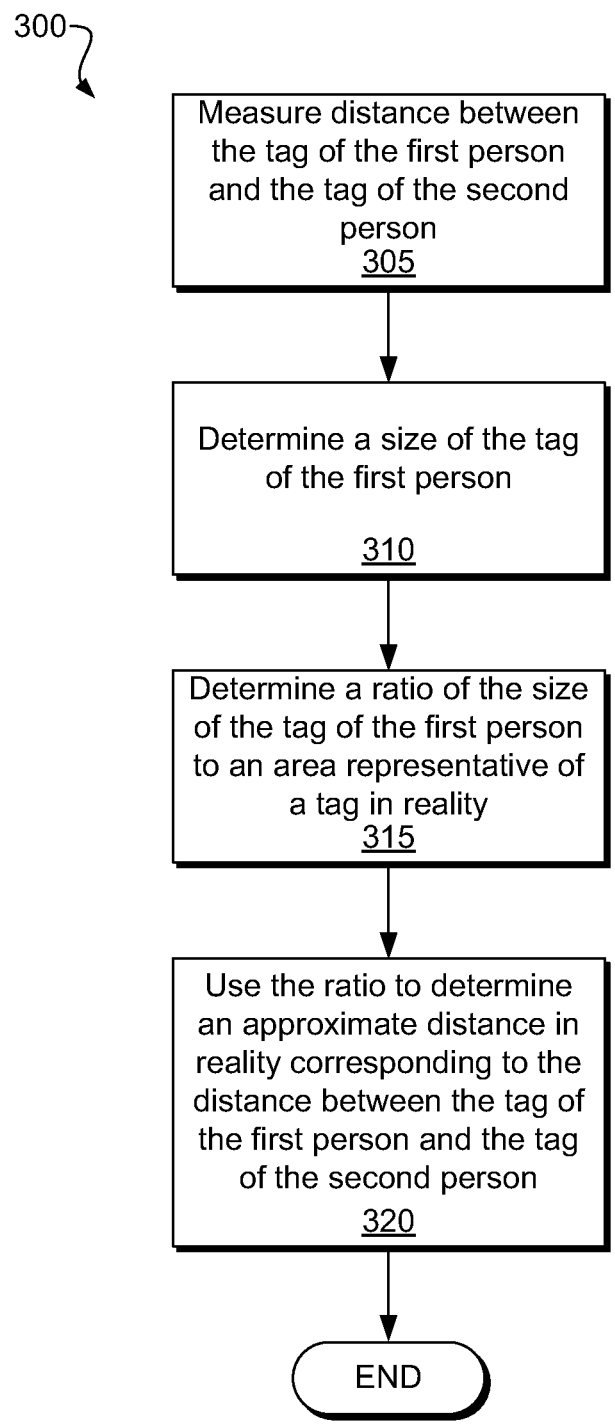
FIG. 3 is a flowchart of an illustrative method of determining a real distance between two persons represented in an image, according to one example of principles described herein.

Referring now to FIG. 3, an illustrative method (300) of determining the physical distance represented in an identified image is given. In this method (300), a distance is measured (block 305) between the area of the image associated with the tag of the first person and the area of the image associated with the tag of the second person. This distance may be measured as the minimum distance between an edge of the area of the first person's tag and an edge of the area of the second person's tag, as a distance between the respective centers of the areas, as an average distance between the areas, or using any other method that may suit a particular application of the principles described herein. In electronically stored or captured images, this distance may be measured as a number of pixels.

A size of the tag of the first person may also be determined (block 310), as well as a ratio (block 315) of the size of the tag of the first person to an area representative of such a tag in real space. The area representative of the tag in real space may be a reference area chosen as the average area of all possible tags in reality. In certain examples, the reference area representative of the tag in real space may be chosen as a rectangle that fits a face size of 0.7 meters.

The ratio determined in block 315 may be considered a linear representation of the relationship between size of objects depicted in the image and the size of those objects in real space. As such, the ratio may be used (block 320) to determine an approximate distance in real space corresponding to the measured distance between the tag of the first person and the tag of the second person in the image.

Returning to FIG. 1, a determination (block 115) of a total number of persons that appear in each identified image may be made after, before, or concurrent to the determination (block 110) of the approximate physical distance between the first person and the second person in real space represented by each identified image.

A weighted affinity value between the first person and the second person may then be determined (block 120) based on the approximated physical distance between the first person and the second person in real space represented by each identified image, the total number of persons appearing in each identified image, and the total number of the identified images.

The calculated weighted affinity value may be based on the following assumptions: 1) the distance between the location of the first person's face and the second person's face is indicative of the affinity between the first person and the second person; 2) the more faces are found in an image, the less trustworthy the face location distance is as an indicator of affinity; and 3) the more co-appearances of the first and second persons in the images, the more trustworthy the face location distance is as an indicator of affinity.

These assumptions may be captured in the following example formula for determining the weighted affinity value between the first person and the second person:

$$w(P_i, P_j) = \left[\frac{1}{m}\sum_{l=1}^{m}(d_{I_l}(P_i, P_j) * \sqrt{f_{I_l} - 1})\right] * e^{-\alpha m} \quad \text{(Equation 1)}$$

where $w(P_i, P_j)$ represents the weighted affinity value between the first person and the second person, m represents the total number of identified images in which both the first person and the second person appear, $d(I_l)$ represents the real space distance represented between the first person and the second person in image $I_l$, $f(I_l)$ represents the total number of faces in image $I_l$, and α represents a constant. Thus, in this example, a smaller weighted affinity value represents a higher degree of measured affinity, and a greater weighted affinity value represents a lower degree of measured affinity. As is demonstrated later on with respect to the identification of social clusters, this inverse relationship can be useful in the construction of a weighted adjacency matrix from the normalized weighted affinity values.

Figure 4:
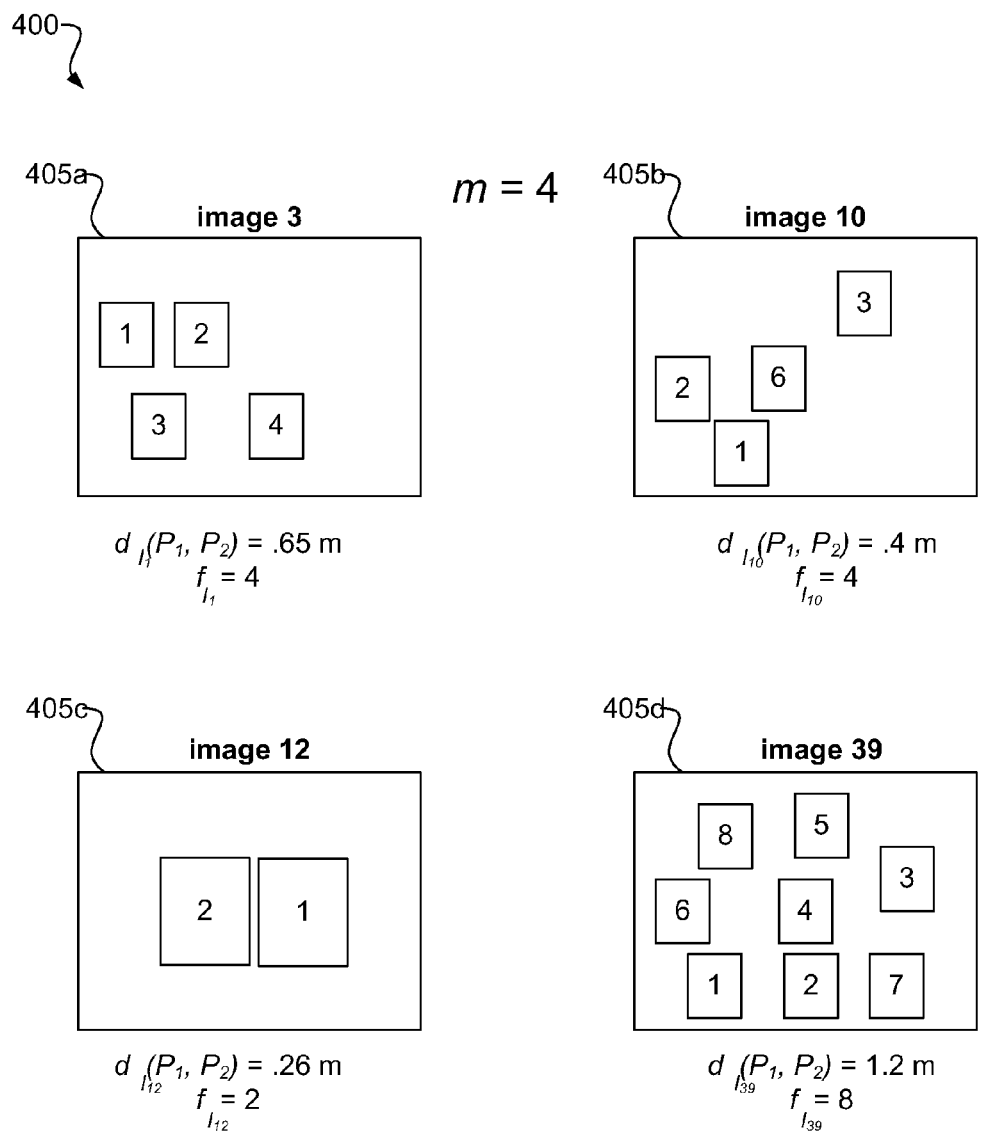
FIG. 4 is a diagram of an illustrative plurality of images, according to one example of principles described herein.

Referring now to FIG. 4, a diagram is shown of an illustrative set (400) of images (405a-d) in which both a first person (1) and a second person (2) appear. In certain examples, this set (400) of images (405a-d) may be a subset of a greater group of images. Also shown in FIG. 4 are example terms from Equation 1 above. Thus, m=4 because 4 images have been identified in which both the first person (1) and the second person (2) appear. For image (405a), d ($P_1$, $P_2$)=0.65 meters and f=4. Similarly, for image (405b), d ($P_1$, $P_2$)=0.4 meters and f=4; for image (405c), d ($P_1$, $P_2$)=0.26 meters and f=2; and for image (405d), d ($P_1$, $P_2$)=1.2 meters and f=8.

Figure 5:
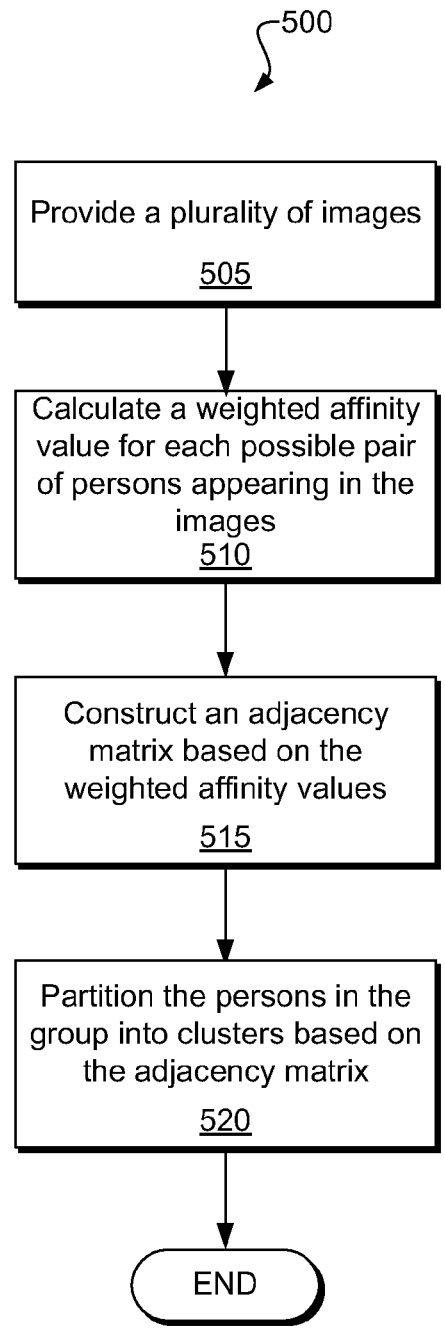
FIG. 5 is a flowchart of an illustrative method of identifying social clusters from a plurality of images, according to one example of principles described herein.

Referring now to FIG. 5, a flowchart diagram is shown of an illustrative method (500) of identifying social clusters within a group of persons shown in a plurality of images using the principles described above for quantifying affinity. According to this method (500), a plurality of images is provided (block 505), and a weighted affinity value for each possible pair of persons appearing in the images is calculated (block 510). This weighted affinity value for a pair of persons may be determined based on a sum of weighted physical distances represented between the persons in the pair in the plurality of images. The weighted affinity value may be calculated following the methodology described above, where the physical distances are weighted according to the total number of images in which both persons in the pair are shown and according to the total number of persons in each image showing both persons in the pair.

Each person in the group can then be modeled as a vertex in a unitary graph such that a normalized adjacency matrix A* can be constructed (block 515) for the vertices based on the weighted affinity values. The normalized adjacency between any two vertices (i, j, respectively) is defined in the normalized adjacency matrix A* as follows:

$$A_{ij}^* = \begin{cases} 1 - w^*(P_i, P_j) & \text{if } e_{ij} \text{ exists} \\ 0 & \text{otherwise} \end{cases} \quad \text{(Equation 2)}$$

where $e_{ij}$ represents the existence of an edge between vertex i and vertex j, which exists between vertex i and vertex j only if person $P_i$ and person $P_j$ both appear in at least one image such that the w ($P_i$, $P_j$) from Equation 1 is not equal to zero. w* ($P_i$, $P_j$) is a normalized version of w ($P_i$, $P_j$) such that $$w^*(P_i, P_j) = \begin{cases} w(P_i, P_j)/T & \text{if } w(P_i, P_j) \leq T \\ 1 & \text{otherwise} \end{cases} \quad \text{(Equation 3)}$$

where T is a distance threshold beyond which the connection of $P_i$ and $P_j$ can be safely ignored. The normalized adjacency matrix A* defined by Equation 3 preserves the property that A* is symmetric so that the eigenvalues of A* are real.

The persons in the group may then be partitioned (block 520) into social clusters representative of social networks using the adjacency matrix by performing clustering on the vertices of the unitary graph such that the vertices are grouped into modular clusters representative of social clusters among the persons in the images. Any suitable clustering of unitary graphs in the art may be applied to partition the persons into social clusters based on the unitary graph model and the adjacency matrix. One example partitioning that may be used is the leading eigenvector method described in M. E. J. Newman, *Finding Community Structure in Networks Using the Eigenvectors of Matrices*, University of Michigan Department of Physics and Center for the Study of Complex Systems, Jul. 23, 2006, at 7-19 (hereinafter "Newman"), which is incorporated by reference herewith in its entirety. The application of this method to partition the persons into social clusters using normalized adjacency matrix A* is now discussed with reference to FIGS. 6 and 7.

Figure 6:
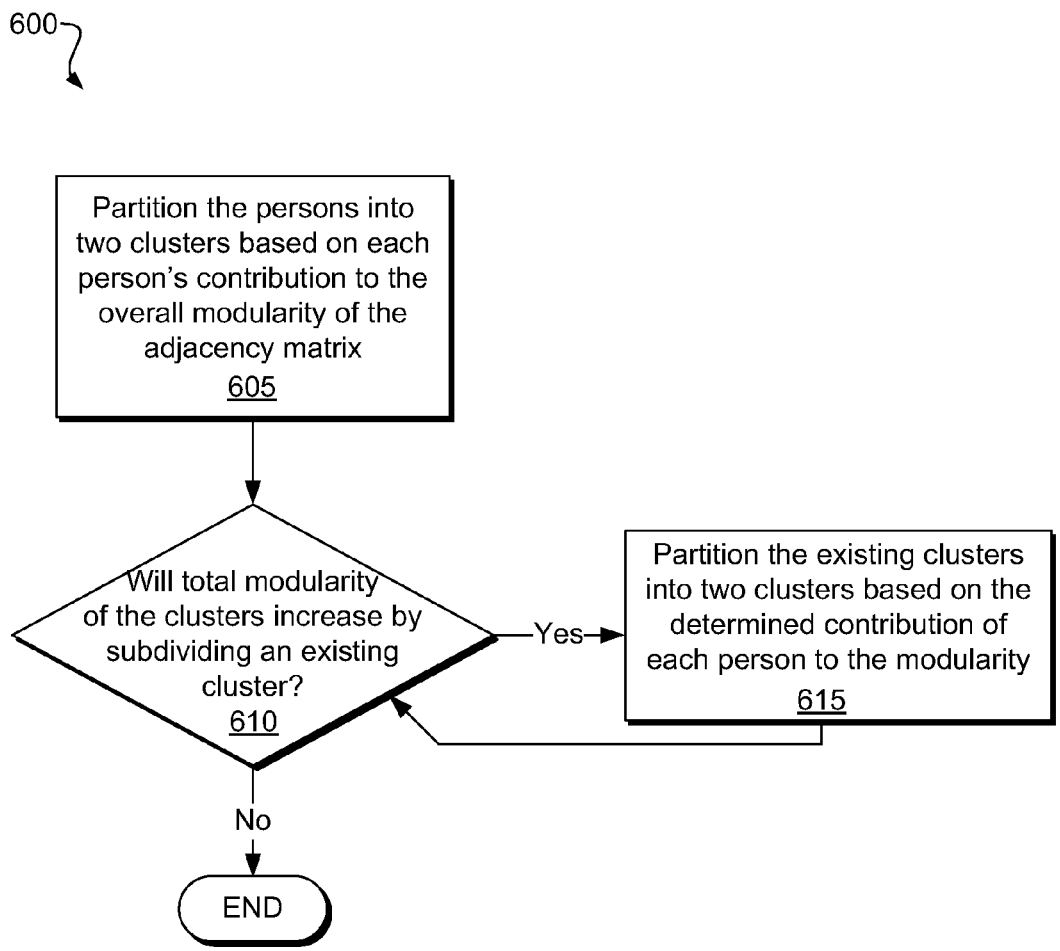
FIG. 6 is a flowchart of an illustrative method of partitioning persons shown in a plurality of images into clusters, according to one example of principles described herein.

Referring now to FIG. 6, a flowchart diagram is shown of an illustrative heuristic method (600) for partitioning the persons into social clusters based on the normalized adjacency matrix A*. Under this method (600), the persons may be partitioned (block 605) into two clusters based on each persons' contribution to the overall modularity of the adjacency matrix A*. A determination (block 610) may then be made as to whether the total modularity of the clusters increases by subdividing an existing cluster. If not, no more partitions are made and the process ends. If, on the other hand, subdividing an existing cluster results in an increased total modularity of the clusters, the existing cluster may be partitioned (block 615) into two clusters based on the determined contribution of each person in the existing cluster to the modularity of the existing cluster. The determination and partitioning described in blocks 610 and 615 may be continuously repeated until no further division of a cluster results in an increased modularity of the existing clusters.

Figure 7:
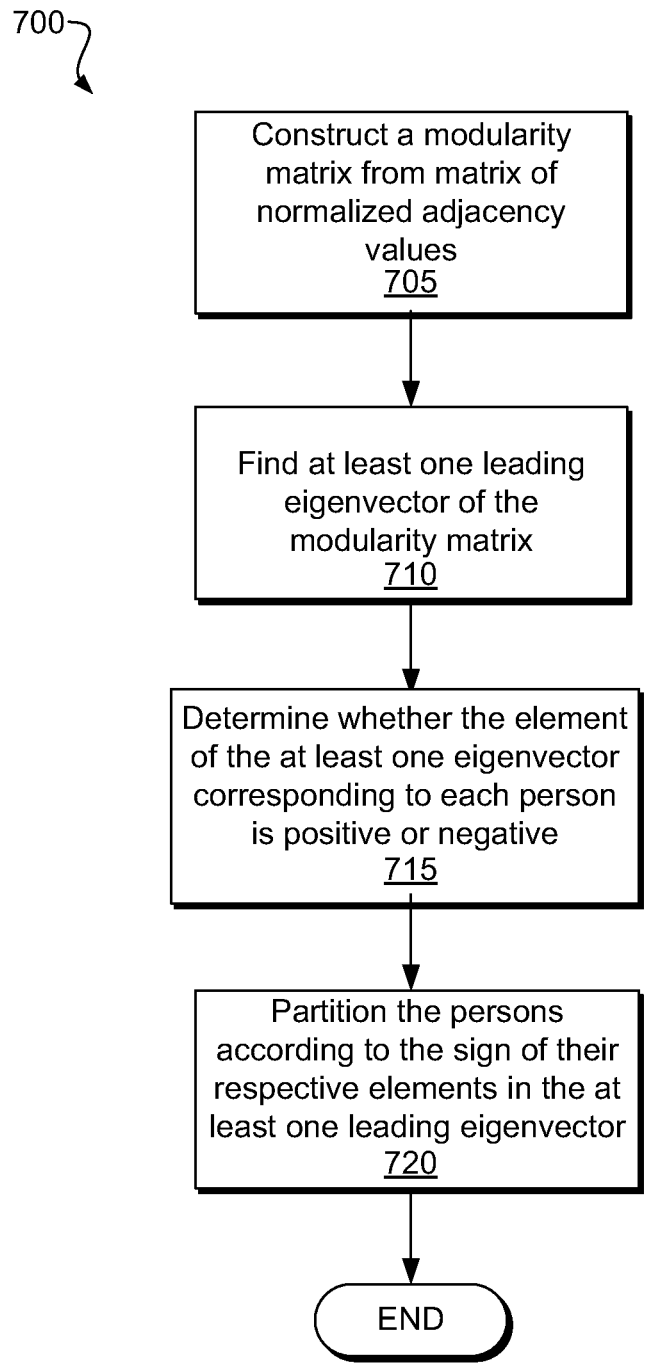
FIG. 7 is a flowchart of an illustrative method of partitioning persons shown in a plurality of images into two clusters based on social affinity, according to one example of principles described herein.

Referring now to FIG. 7, a flowchart is shown of an illustrative method (700) of partitioning an existing cluster of persons into two clusters according to the contribution of each person to the modularity of the cluster. This illustrative method (700) may be applied to carry out the functionality recited in blocks 605 and 615 of the method (600) described in FIG. 6. To begin, a modularity matrix is constructed from the adjacency matrix corresponding to the cluster. For the initial partition of block 605 in FIG. 6, the adjacency matrix is A*, the normalized adjacency matrix for the entire group of persons. For the partition of block 615 in FIG. 6 of an existing cluster containing a subset of the entire group of persons, the adjacency matrix is simply a subset of A* containing only the rows and columns corresponding to the vertices representing the subset of persons present in the existing cluster.

The elements of the modularity matrix B of A* are defined as follows:

$$B = A^* - P \quad \text{(Equation 3)}$$

where $$P_{ij} = \frac{k_i k_j}{2m}. \quad \text{(Equation 4)}$$

where $k_i$ is the degree of vertex i, $k_j$ is the degree of vertex j, and m represents the number of edges existing between the vertices in the cluster being partitioned (not to be confused with the m term of Equation 1).

Once the modularity matrix is constructed (block 705), at least one leading eigenvector of the modularity matrix may be found (block 710). The eigenvector has an element corresponding to each individual person in the group, which is either positive or negative (block 715). The persons may then be partitioned (block 720) into two new clusters based on whether their corresponding elements in the leading eigenvector is positive or negative. In other examples, multiple elements from multiple leading eigenvectors respectively may be used to partition the persons into the two new clusters, consistent with the principles described in the aforementioned Newman reference.

Figure 8:
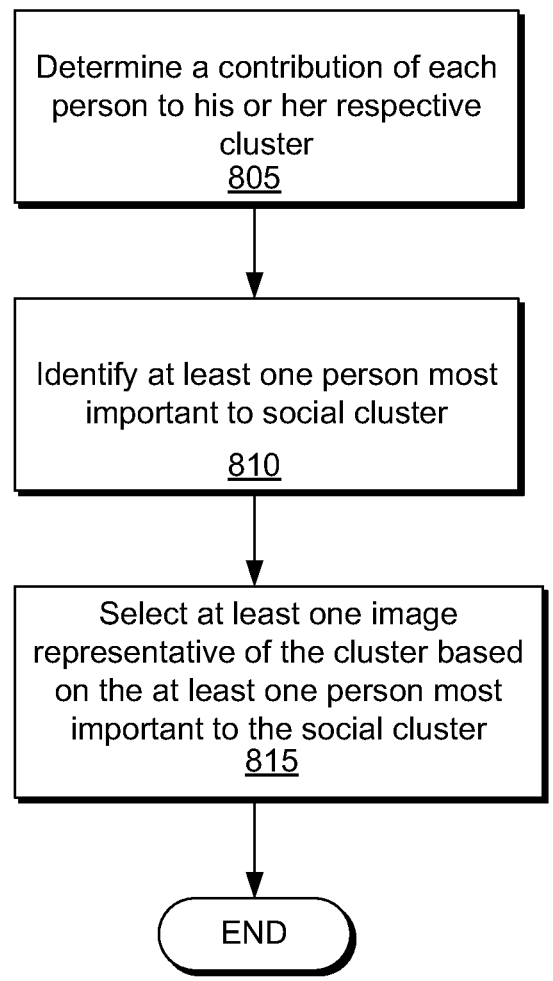
FIG. 8 is a flowchart of an illustrative method of processing an identified social cluster from a plurality of images, according to one example of principles described herein.

Referring now to FIG. 8, a flowchart diagram is shown of an illustrative method (800) of processing a plurality of images once a group of persons appearing in the images has been partitioned into social clusters according to the principles described above.

In the method (800) of FIG. 8, a contribution of each person in a social cluster to his or her respective cluster may be determined (block 805). This determination may be made by returning to the modularity matrix B described above. Because B is real and symmetric, it can be written in the form $$B = UDU^T \quad \text{(Equation 5)}$$

where U is the matrix of eigenvectors of B, and D is the diagonal matrix of eigenvalues $D_{ii} = \beta_i$. Where there are p positive eigenvalues of B, a vertex vector $[x_i]$ of dimension p can be defined such that $$[x_i]_j = \sqrt{\beta_j} U_{ij} \quad \text{(Equation 6)}$$

The magnitude of $x_i$ indicates the quantified contribution of vertex i to the cluster structure. In other words, the social role of the person corresponding to vertex i in the cluster to which he or she belongs can be measured by $|x_i|$. Thus, by calculating an $x_i$ value for each person in a cluster, at least one most important person to the cluster can be identified (block 810). Upon identifying the at least one most important person to the cluster, at least one image from the plurality of images can be selected (block 815) based on the at least one person most important to the cluster. For example, the at least one image may be selected based on a prominence of the at least one most important person in the at least one image. Prominence may be determined by, among other things, the size of a tag associated the at least one person relative the size of an image in which the at least one person appears.

Figure 9:
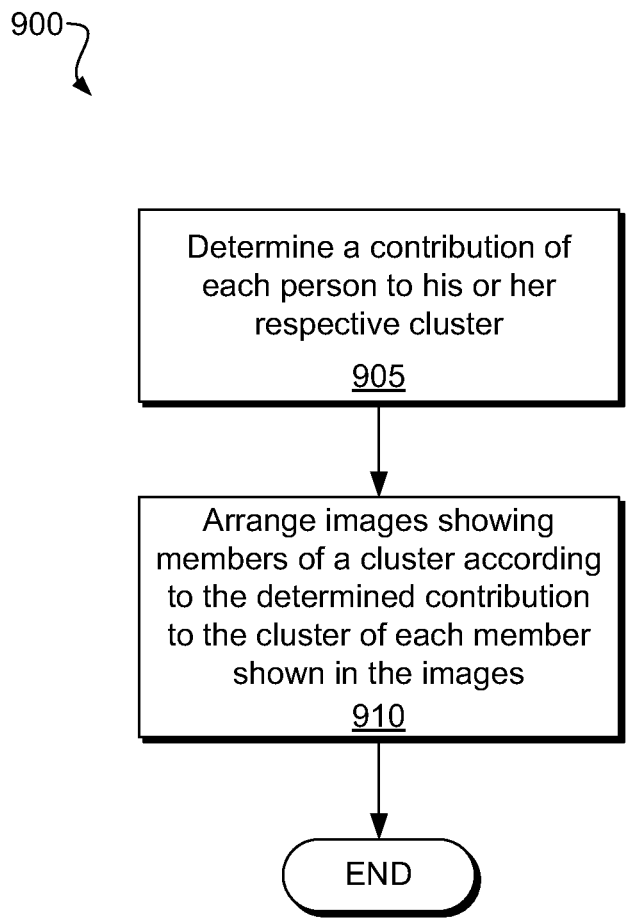
FIG. 9 is a flowchart of an illustrative method of processing an identified social cluster from a plurality of images, according to one example of principles described herein.

FIG. 9 shows a flowchart diagram of another illustrative method (900) of processing a plurality of images once a group of persons appearing in the images has been partitioned into social clusters according to the principles described above. In the method of FIG. 9, the quantified contribution of each person to his or her respective cluster may be determined (block 905) consistent with the principles described above, and then at least some of the images in the plurality of images may be arranged (block 910) showing members of a cluster in an order determined by the appearance and/or prominence of each member of the cluster in the images and the determined contribution of each member to the cluster.

In additional examples, images showing members of a particular cluster may be indexed according to which members of the cluster are shown in the images and the contribution by each member to the modularity of the cluster.

Figure 10:
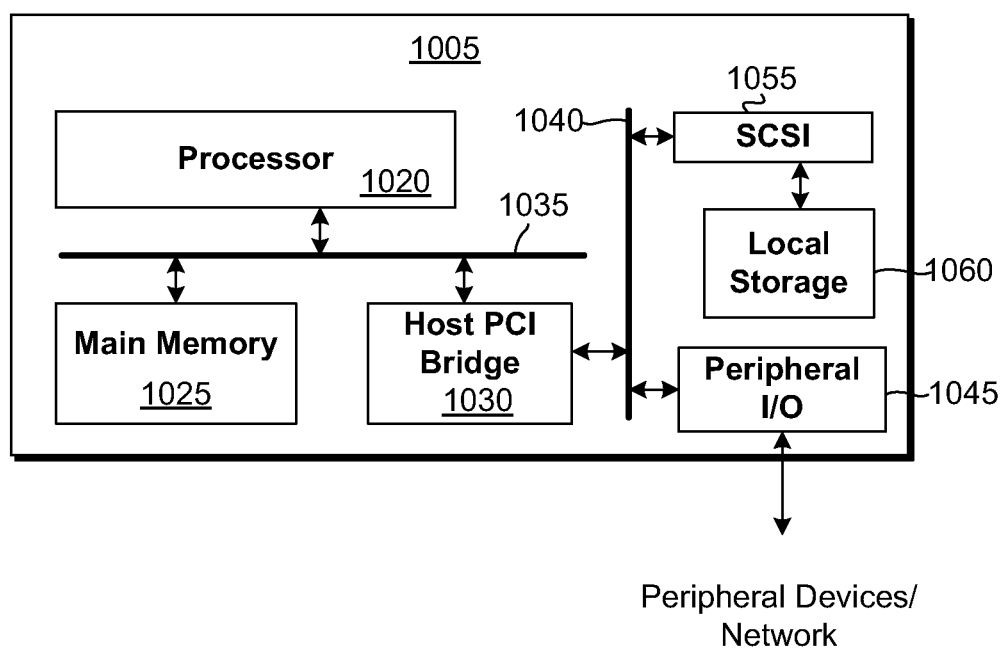
FIG. 10 is a block diagram of an illustrative system for quantifying social affinity from a plurality of images.

Referring now to FIG. 10, an illustrative computing device (1005) is shown that may be used to implement the functionality described in the present specification. The computing device (1005) may be a hardware device that executes code stored in a main memory (125). Accordingly, the computing device includes a processor (1020), which may be a multi-core processor or a single-core processor.

The processor (1020) retrieves executable code from the main memory (1025) and executes the executable code according to a defined program order in order to implement the functionality described in the present specification with respect to the quantification of social affinity from a plurality of images, the partitioning of persons into social clusters based on quantified social affinity, and the like. The main memory (1025) may store data structures, such as variables, matrices, and other objects for performing the functionality described herein, including but not limited to the plurality of images.

The processor (1020) may be communicatively coupled to the main memory (1025) and a host peripheral control interface (PCI) bridge (1030) through a main bus (1035). The main memory (1025) may include dynamic non-volatile memory, such as random access memory (RAM).

The host PCI bridge (1030) may act as an interface between the main bus (1035) and a peripheral bus (1040) used to communicate with peripheral I/O devices (1045). These peripheral devices may include, but are not limited to, a network interface configured to communicate with an external network, external human interface devices (e.g., monitor, keyboard, mouse, touch screen, speaker, microphone), other external devices (e.g., external storage, dongles, specialized tools), serial buses (e.g., Universal Serial Bus (USB)), and the like. A Small Computer System Interface (SCSI) (1055) for communicating with local storage devices (1060) may also communicate with the peripheral bus (1040).

It will be readily apparent to those having skill in the art that the present configuration of the computing device (1005) is merely illustrative of one type of computing device (1005) that may be used in connection with the principles described in the present specification. Moreover, it will be further apparent that various modifications, additions, and deletions to the computing device (1005) shown are conceivable and anticipated by the present specification.

The specification and figures describe methods and systems of quantifying social affinity between persons appearing in a plurality of images, and the use of this quantified social affinity to partition persons into clusters of social relevance. The quantified social affinity between a first person and a second person is based on a total number of persons appearing in each image identified as showing both the first person and the second person, a physical distance represented in each identified image between the first person and the second person, and a total number of the identified images This method of quantifying social affinity can provide a more accurate and precise tool in inferring social relationships from images.

The preceding description has been presented only to illustrate and describe embodiments and examples of the principles described. This description is not intended to be exhaustive or to limit these principles to any precise form disclosed. Many modifications and variations are possible in light of the above disclosure.

What is claimed is:

1. A method of quantifying social affinity between a first person and a second person from a plurality of images, comprising:
   identifying with at least one processor each image in said plurality of images showing both said first person and said second person, the identified images forming a group of images;
   determining with said at least one processor a weighted affinity value between said first person and said second person based on a total number of persons appearing in each said identified image, a physical distance represented in each said identified image between said first person and said second person, and a total number of said identified images;
   partitioning said persons in said group of images into a plurality of social clusters based on an adjacency matrix formed from said weighted affinity values;
   associating, with said at least one processor, a first tag with said first person and a second tag with said second person in each said identified image, said first tag and said second tag associating said first person and said second person with respective first and second spatial areas within said identified image; and
   determining said physical distance represented between said first person and said second person in each said identified image by:
      measuring a distance between said first tag and said second tag in said image;
      determining a ratio of a size of at least one of said first and second tags to a size representative of said at least one of said first and second tags in real space; and
      using said ratio to determine an approximate physical distance in real space corresponding to said measured distance between said first tag and said second tag.

2. The method of claim 1, further comprising:
   performing an automatic face detection process to detect at least one of a face of said first person and a face of said second person; and
   creating at least one of said first tag and said second tag automatically in response to said detecting at least one of said face of said first person and said face of said second person.

3. The method of claim 1, said determining said weighted affinity value between said first person and said second person comprising:
   weighting each said physical distance represented in each said identified image according to said total number of said persons appearing in said identified image and said total number of said identified images; and
   summing said weighted physical distances to produce said weighted affinity value.

4. A method of identifying affinity-based social clusters from a plurality of photos, comprising:
   identifying with at least one processor a group of persons appearing in a plurality of images;
   determining, with said at least one processor, a weighted affinity value for each possible pair of persons in said group, said weighted affinity value being based on a sum of weighted physical distances represented between said persons in said pair in said plurality of images, comprising:
      associating a first tag with a first person and a second tag with a second person in each said identified image, said first tag and said second tag associating said first person and said second person with respective first and second spatial areas within said identified image; and
      determining said physical distance represented between said first person and said second person in each said identified image by:
         measuring a distance between said first tag and said second tag in said image;
         determining a ratio of a size of at least one of said first and second tags to a size representative of said at least one of said first and second tags in real space; and
         using said ratio to determine an approximate physical distance in real space corresponding to said measured distance between said first tag and said second tag;
   creating, with said at least one processor, an adjacency matrix based on said weighted affinity values for said group; and
   partitioning said persons in said group into social clusters based on said adjacency matrix.

5. The method of claim 4, each said weighted distance in said sum of weighted distances comprising an approximated real distance between said persons in said pair represented in an individual said image, said approximate real distance being weighted according to a total number of persons in said individual image and a total number of images in said plurality of images that show both said persons in said pair.

6. The method of claim 4, each said person in said group being associated with a separate row and a separate column in said adjacency matrix, and each element in said adjacency matrix representing a normalized adjacency between a person in said group associated with a row of said element and a person in said group associated with said column of said element.

7. The method of claim 4, further comprising constructing a modularity matrix from said adjacency matrix.

8. The method of claim 7, said partitioning said persons in said groups into clusters based on said adjacency matrix comprising:
   associating each said person in said group with at least one element in at least one eigenvector of said modularity matrix; and
   assigning each said person in said group to either a first cluster or a second cluster based on a value of said at least one element associated with said person.

9. The method of claim 8, further comprising:
   partitioning any said existing cluster for which it is determined that such a partition would increase an overall modularity of said clusters; and
   repeating said partitioning until no further partitioning of said clusters increases said overall modularity of said clusters.

10. The method of claim 4, further comprising determining with said at least one processor a quantified contribution made by each said person in a said cluster to a modularity of that said cluster.

11. The method of claim 10, further comprising identifying with said at least one processor at least one most important person in said cluster according to said quantified contribution made by said at least one most important person to said modularity of said cluster.

12. The method of claim 11, further comprising selecting an image from said plurality of images based on a prominence of said at least one most important person in said selected image.

13. The method of claim 11, further comprising arranging images showing persons belonging to said cluster in an order based on a prominence of said at least one most important person in said arranged images.

14. The method of claim 10, further comprising indexing images showing persons belonging to said cluster from said plurality of images according to which said persons belonging to said cluster are shown in each indexed image and said quantified contribution made by each said person in said cluster to said modularity of said cluster.

15. The method of claim 4, further comprising creating an image product based on at least one cluster.

16. The method of claim 4, further comprising:
identifying a person most important to each cluster; and
selecting at least one image representative of the cluster based on the at least one person most important to the social cluster.

17. The method of claim 4, further comprising arranging images showing members of a cluster according to a contribution to the cluster of each member shown in the images.

18. The method of claim 4, in which the persons in the group are partitioned into the social clusters using the adjacency matrix by executing a clustering algorithm on the vertices of a unitary graph such that the vertices are grouped into modular clusters representative of the social clusters among the persons in the images.

19. A system of quantifying social affinity between at least a first person and a second person, comprising:
at least one processor; and
a memory communicatively coupled to said processor, said memory comprising executable code that, when executed by said processor, causes said processor to:
identify each image from said plurality of images in which both said first person and said second person appear;
for each identified image, determine a physical distance between said first person and said second person represented in said image and weigh said physical distance based on a total number of persons appearing in said identified image and a total number of said identified images; and
sum each weighted physical distance to produce a weighted affinity value between said first person and said second person,
in which determining a physical distance between said first person and said second person comprises:
measuring a distance between a first tag and a second tag in each identified image, said first tag and said second tag associating said first person and said second person with respective first and second spatial areas within said identified image;
determining a ratio of a size of at least one of said first and second tags to a size representative of said at least one of said first and second tags in real space; and
using said ratio to determine an approximate physical distance in real space corresponding to said measured distance between said first tag and said second tag.

20. The system of claim 19, said executable code further causing said processor to determine said weighted affinity value for each possible pair of persons in a group of persons appearing in said plurality of images.

21. The system of claim 20, said executable code further causing said processor to partition said persons in said group into a plurality of clusters based on said weighted affinity values.

* * * * *